United States Patent
Heinze et al.

(10) Patent No.: US 7,413,237 B2
(45) Date of Patent: Aug. 19, 2008

(54) TRIM SYSTEM FOR A VEHICLE DOOR

(75) Inventors: Mark Heinze, Clarkston, MI (US); Alan G. Dry, Grosse Point Woods, MI (US); David J. Dooley, Troy, MI (US); Leyang Lu, Southfield, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 0 days.

(21) Appl. No.: 11/534,778

(22) Filed: Sep. 25, 2006

(65) Prior Publication Data

US 2008/0073933 A1    Mar. 27, 2008

(51) Int. Cl.
*B60R 13/02* (2006.01)

(52) U.S. Cl. .................. 296/146.7; 296/146.6; 296/153

(58) Field of Classification Search ................ 296/39.1, 296/146.6, 146.7, 152, 153; 29/897.2; 49/502
See application file for complete search history.

(56) References Cited

U.S. PATENT DOCUMENTS

| | | | | |
|---|---|---|---|---|
| 2,922,674 | A * | 1/1960 | Hollerbach | 296/153 |
| 5,090,158 | A * | 2/1992 | Bertolini | 49/348 |
| 5,308,138 | A * | 5/1994 | Hlavaty | 296/146.6 |
| 5,573,272 | A * | 11/1996 | Teshima | 280/751 |
| 5,636,866 | A * | 6/1997 | Suzuki et al. | 280/748 |
| 5,857,702 | A * | 1/1999 | Suga et al. | 280/751 |
| 5,927,020 | A | 7/1999 | Kobrechel | |
| 6,145,919 | A * | 11/2000 | Mysliwiec et al. | 296/153 |
| 6,196,605 | B1 * | 3/2001 | Baldas et al. | 296/37.13 |
| 6,412,852 | B1 * | 7/2002 | Koa et al. | 296/146.7 |
| 6,612,641 | B2 * | 9/2003 | Schutt et al. | 296/152 |
| 6,854,785 | B2 * | 2/2005 | Simon et al. | 296/146.7 |
| 6,857,688 | B2 | 2/2005 | Morrison et al. | |
| 7,008,003 | B1 * | 3/2006 | Hirose et al. | 296/146.7 |
| 7,108,311 | B2 * | 9/2006 | Dooley et al. | 296/146.7 |
| 2001/0030444 | A1 * | 10/2001 | Whitehead et al. | 296/146.7 |
| 2002/0113459 | A1 * | 8/2002 | Laborie et al. | 296/146.6 |
| 2004/0155483 | A1 | 8/2004 | Lin et al. | |
| 2005/0140167 | A1 * | 6/2005 | Jaggi | 296/146.7 |

FOREIGN PATENT DOCUMENTS

| | | | | |
|---|---|---|---|---|
| DE | 3510018 A1 * | 1/1986 | | 296/140 |
| DE | 44 35 287 | 7/1996 | | |
| DE | 197 38 656 | 3/1999 | | |
| DE | 199 43 989 | 4/2001 | | |
| JP | 58105836 A * | 6/1983 | | |
| JP | 03045421 A * | 2/1991 | | 296/146.4 |
| JP | 03139446 A * | 6/1991 | | |
| JP | 04183636 A * | 6/1992 | | 296/146.5 |

OTHER PUBLICATIONS

German Office Action for the corresponding German Patent Application No. 10 2007 045 735.0-24 mailed May 8, 2008.

* cited by examiner

*Primary Examiner*—D. Glenn Dayoan
*Assistant Examiner*—Paul A Chenevert
(74) *Attorney, Agent, or Firm*—Brooks Kushman P.C.

(57) ABSTRACT

A trim system configured to be received by a vehicle door substrate is provided. Some embodiments of the trim system include a locator and a feature. The feature is moveable relative to the locator after the locator is assembled with the substrate. Some embodiments of the trim system include a first and second feature. The second feature is moveable relative to the first feature after the first feature is assembled with the substrate.

19 Claims, 7 Drawing Sheets

TRIM SYSTEM FOR A VEHICLE DOOR

BACKGROUND OF THE INVENTION

Field of the Invention

The invention generally relates to trim systems for vehicle doors.

SUMMARY

A trim system is configured to be assembled in an assembled position with a vehicle door panel substrate having a plurality of feature receiving portions and a plurality of receiving locators. The system includes a plurality of feature locators. At least one of the plurality of feature locators is configured to locate the trim system relative to the substrate via one of the plurality of receiving locators. The system also includes a plurality of trim features each connected with at least one of the plurality of feature locators. One of the plurality of trim features is moveable, after the trim system is located relative to the one of the plurality of receiving locators in order to position another one of the plurality of feature locators relative to another one of the plurality of receiving locators.

A trim system is configured to be assembled in an assembled position with a vehicle door panel substrate having a plurality of receiving locators and a plurality of feature receiving portions. The system includes a feature locator configured to locate the trim system relative to the substrate via one of the plurality of receiving locators. The system also includes a pair of trim features associated with the feature locator. Each of the pair of trim features is configured to be received by one of the plurality of feature receiving portions. The pair of trim features are hingedly moveable relative to each other in order to position the pair of trim features in the assembled position prior to locating the trim system relative to the substrate.

A trim system is configured to be assembled in an assembled position with a vehicle door panel substrate having a first feature receiving portion and a second feature receiving portion. The system includes a first trim feature configured to be received by the first feature receiving portion and a second trim feature configured to be received by the second feature receiving portion. The second trim feature is moveable, after the first trim feature is assembled with the substrate, relative to the first trim feature and within the second feature receiving portion to position the second trim feature within the second feature receiving portion in the assembled position.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION

Figure 1A:
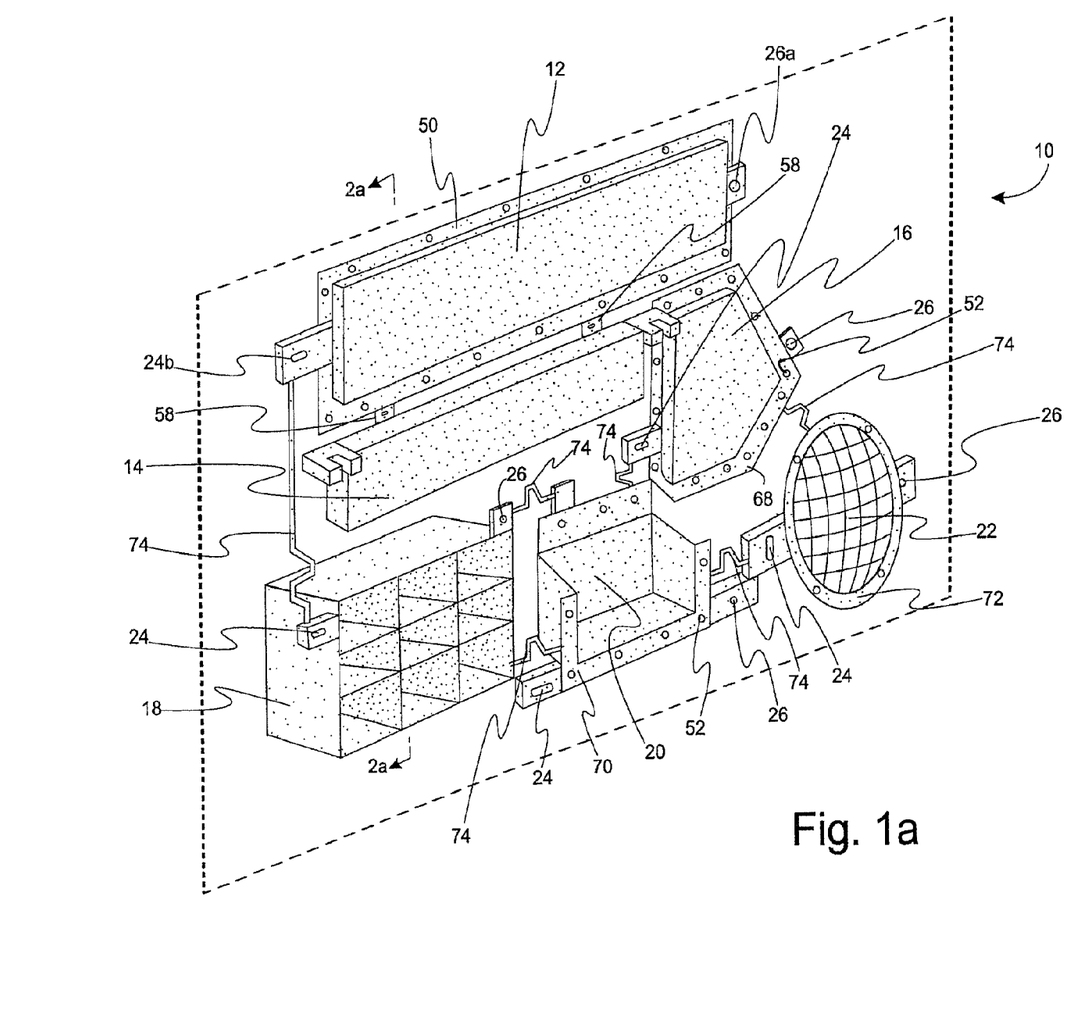
FIG. 1*a* shows a trim system in accordance with an embodiment of the invention.
Figure 1B:
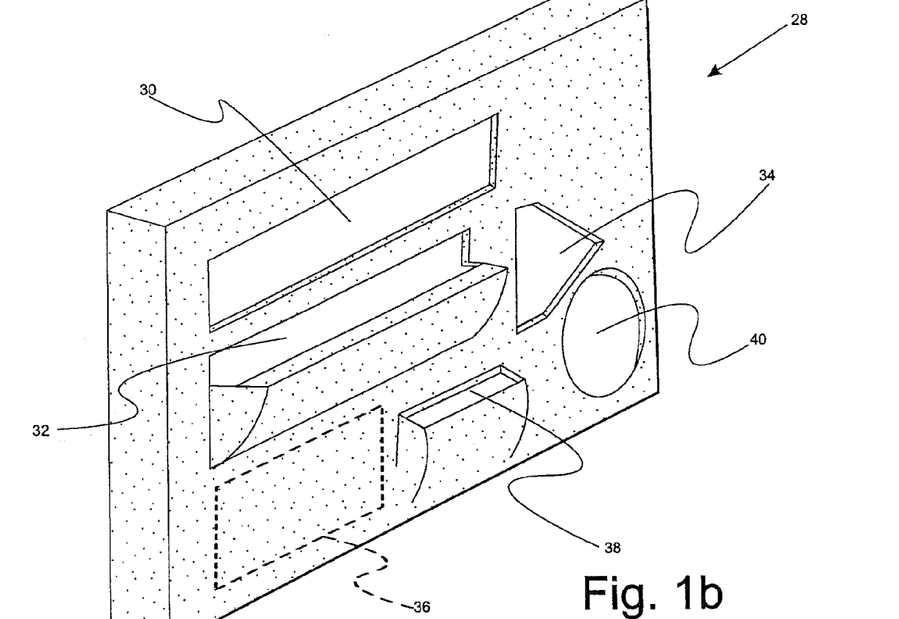
FIG. 1*b* shows a front side of a substrate configured to receive the trim system of FIG. 1*a*.
Figure 1C:
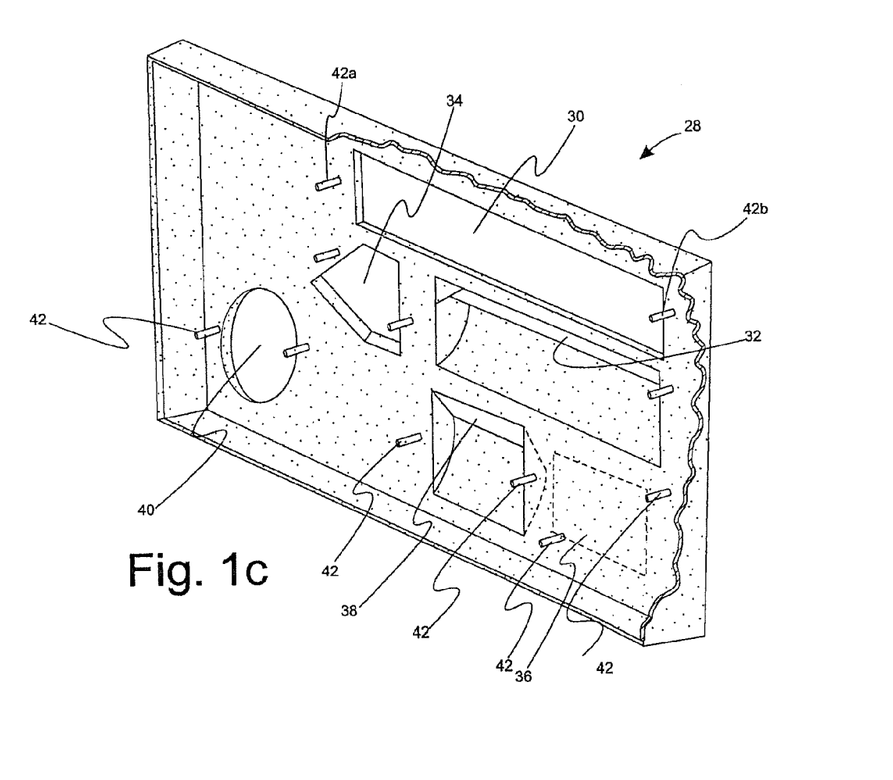
FIG. 1*c* shows a back side of the substrate of FIG. 1*b*.

FIGS. 1*a*, 1*b*, and 1*c* show trim system 10, e.g., cartridge, that may be assembled with vehicle door panel substrate 28. Trim system 10 includes upper bolster 12, arm rest 14, lower bolster 16, and side impact molding 18. Trim system 10 also includes map pocket close-out 20, speaker grill 22, two-way slots 24, and four-way round holes 26. Two-way slots 24 and four-way round holes 26 are used to locate portions of trim system 10 to substrate 28 as will be explained in detail below.

FIG. 1*b* shows the front side of substrate 28. Substrate 28 includes upper bolster opening 30, arm rest opening 32, and lower bolster opening 34. Substrate 28 also includes an area 36 supported by side impact molding 18, map pocket close-out opening 38, and speaker grill opening 40. Once assembled, portions of upper bolster 12, arm rest 14, lower bolster 16, speaker grille 22, and map pocket close-out 20 are visible through openings 30, 32, 34, 40, and 38 or feature receiving portions, respectively.

FIG. 1*c* shows the back side of substrate 28. Substrate 28 includes receiving locators 42, e.g., heat stakes, that, in combination with feature locators, e.g., two-way slots 24 and four-way round holes 26, locate trim system 10 relative to substrate 28.

When molding trim system 10, manufacturing tolerances may cause two-way slots 24 and four-way round holes 26 associated with each of upper bolster 12, arm rest 14, lower bolster 16, side impact molding 18, map pocket close-out 20, and speaker grille 22 to be out of position relative to respective heat stakes 42 associated with openings 30, 32, 34, area 36, and openings 38, 40. As a result, upper bolster 12, arm rest 14, lower bolster 16, side impact molding 18, map pocket close-out 20, and speaker grille 22 are adjustable relative to each other as will be explained in detail below.

Figure 2A:
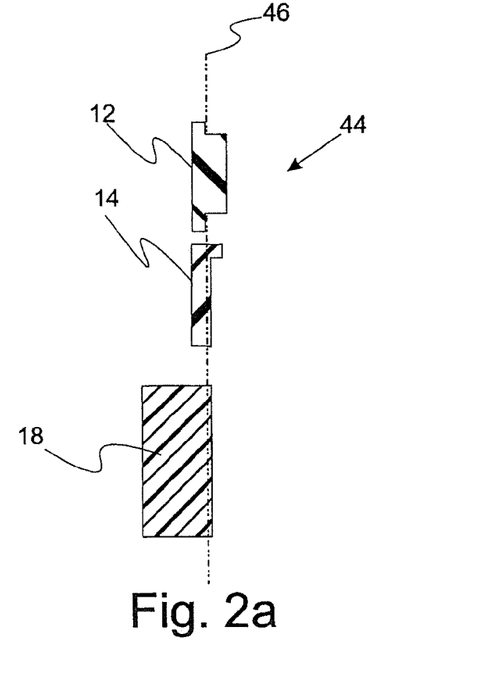
FIG. 2*a* shows a cross-section of a trim system in an as-molded position in accordance with an embodiment of the invention.

FIG. 2a a shows a cross-section of trim system 10 taken along section line 2a-2a of FIG. 1a. In the embodiment of FIG. 2a, these features are molded in different materials. As such, a knit line may occur in the connector, or tie, between these features. These features, however, may be molded in the same material.

Upper bolster 12, arm rest 14, and side impact molding 18 are shown in the as-molded position 44. In the as-molded position 44, axis 46 passes through each of upper bolster 12, arm rest 14, and side impact molding 18 as shown.

Figure 2B:
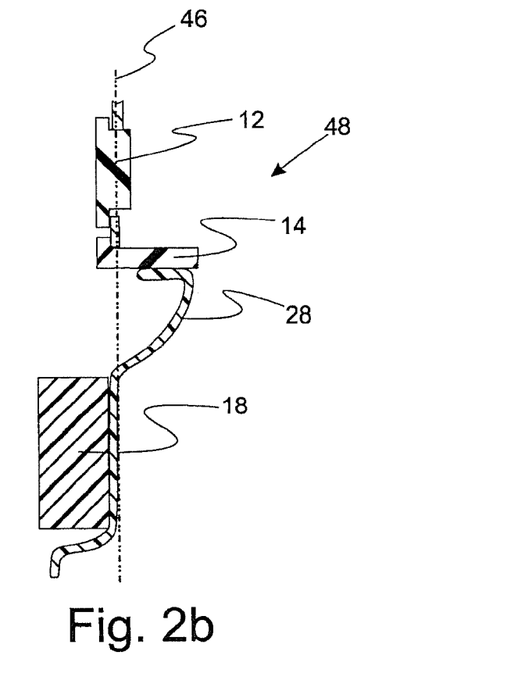
FIG. 2*b* shows a cross-section of the trim system of FIG. 2*a* in an assembled position in accordance with an embodiment of the invention.

FIG. 2b shows upper bolster 12, arm rest 14, and side impact molding 18 in assembled position 48. Arm rest 14 has been rotated relative to upper bolster 12 and now rests at approximately a 90° angle from axis 46. Side impact molding 18 has translated relative to its molded position 44. Connectors between upper bolster 12, arm rest 14, and side impact molding 18 allow for such movement as will be explained in detail below.

Figure 3A:
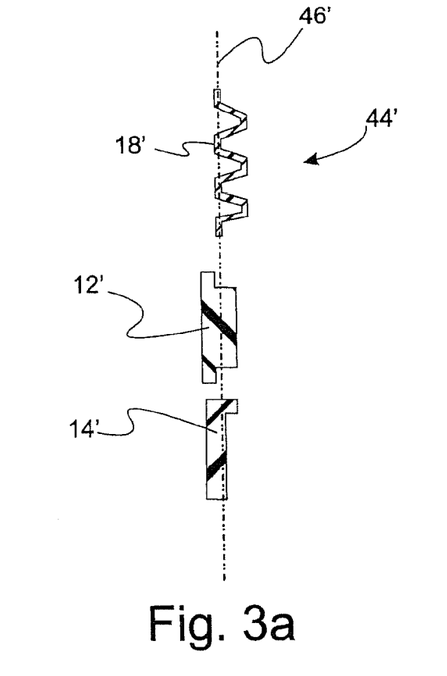
FIG. 3*a* shows a cross-section of a trim system in an as-molded position in accordance with an embodiment of the invention.

FIG. 3a shows a cross-section of an alternative trim system 10' including upper bolster 12', arm rest 14', and side impact molding 18' in molded position 44'.

Figure 3B:
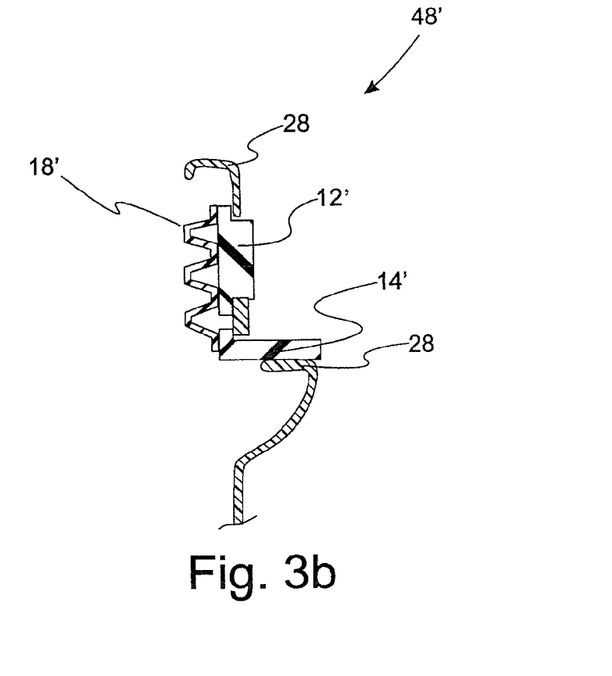
FIG. 3*b* shows a cross-section of the trim system of FIG. 3*a* in an assembled position in accordance with an embodiment of the invention.

FIG. 3b shows upper bolster 12', arm rest 14', and side impact molding 18' in another assembled position 48'. In this assembled position, side impact molding 18' and arm rest 14' are rotated relative to upper bolster 12'. Again, flexible connectors between upper bolster 12', arm rest 14', and side impact molding 18' allow for such movement as will be explained in detail below.

Figure 4A:
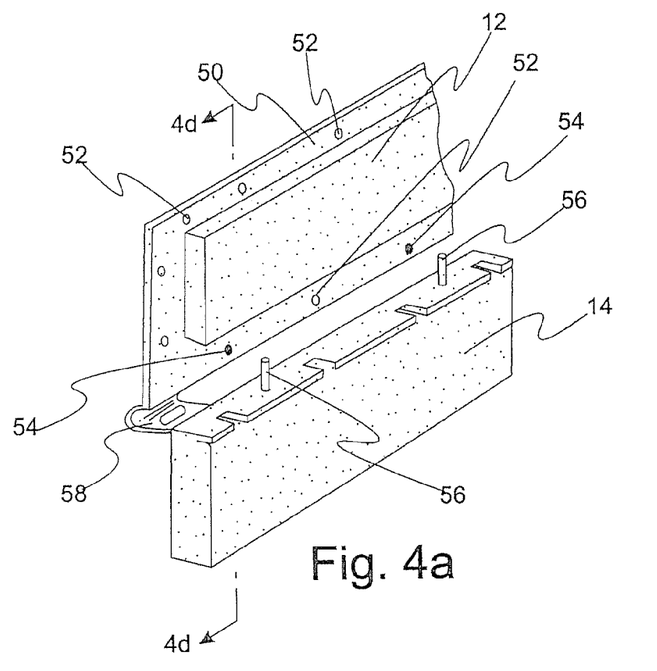
FIG. 4*a* shows a portion of a trim system in accordance with an embodiment of the present invention.

FIG. 4a shows the joint between upper bolster 12 and arm rest 14. Upper bolster 12 includes upper bolster brim 50, heat stake holes 52, and kitting pin holes 54. Substrate 28 further includes heat stakes (not shown) corresponding to holes 52 to facilitate attachment between trim system 10 and substrate 28. Arm rest 14 includes kitting pins 56.

Ribbon tie 58 connects upper bolster 12 with arm rest 14. Ribbon tie 58 may be less than 1 mm thick, e.g., 0.5 mm. Ribbon tie 58 allows arm rest 14 to rotate relative to upper bolster 12 as shown in some of the previous Figures. Kitting pins 56 are snapped into kitting pin holes 54 thus holding arm rest 14 in place relative to upper bolster 12 as will be explained in detail below.

Figure 4B:
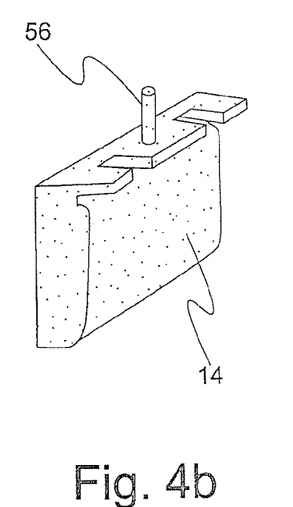
FIGS. 4*b* and 4*c* show the trim system of FIG. 4*a* in further detail.

FIG. 4b shows a portion of arm rest 14. Kitting pins 56 are molded perpendicular to die draw in the parting line of its tool.

Figure 4C:
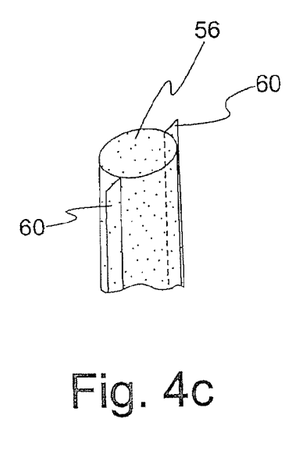

FIG. 4c shows a kitting pin 56 in detail. Kitting pin 56 includes kitting pin flash 60. Kitting pin flash 60 may be approximately 1 mm and, when inserted into a kitting pin hole 54, may provide friction retention further holding arm rest 14 in place relative to upper bolster 12.

Figure 4D:
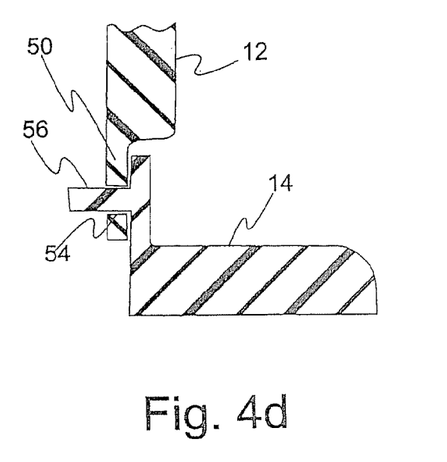
FIG. 4*d* shows a cross-section of the trim system of FIG. 4*a* in accordance with an embodiment of the present invention.

FIG. 4d shows a cross-section of upper bolster 12 and arm rest 14 taken along section line 4d-4d of FIG. 4a. Upper bolster 12 and arm rest 14 are shown in an assembled position where a kitting pin 56 is inserted into a respective kitting pin hole 54 of upper bolster brim 50.

Figure 5A:
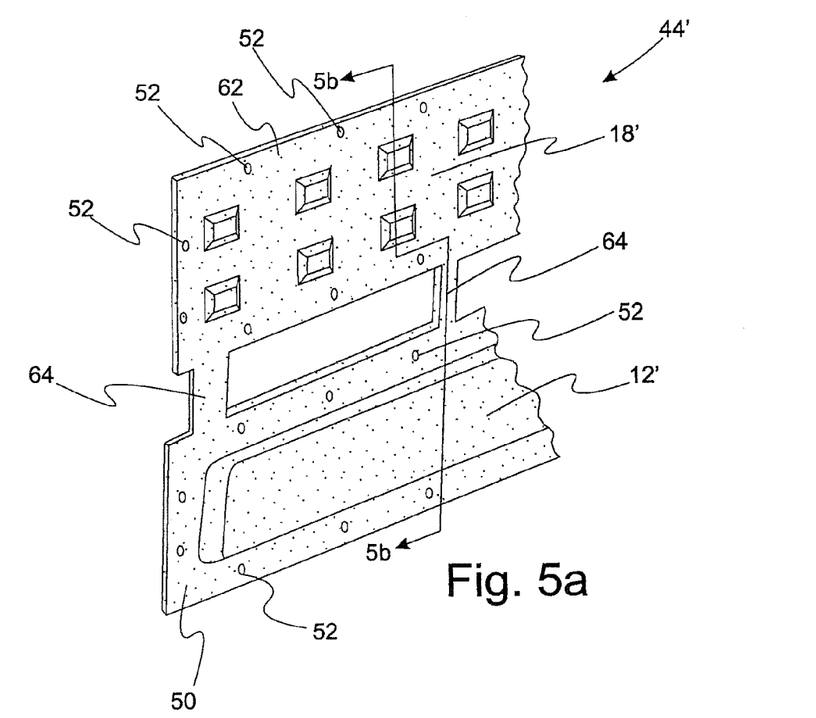
FIG. 5*a* shows a portion of a trim system in accordance with an embodiment of the present invention.

FIG. 5a shows upper bolster 12' and side impact molding 18' in molded position 44'. Side impact molding 18' includes side impact molding brim 62 and heat stake holes 52. Ribbon tie 64 connects upper bolster 12' to side impact molding 18' and may be less than 1 mm thick, e.g., 0.5 mm.

Figure 5B:
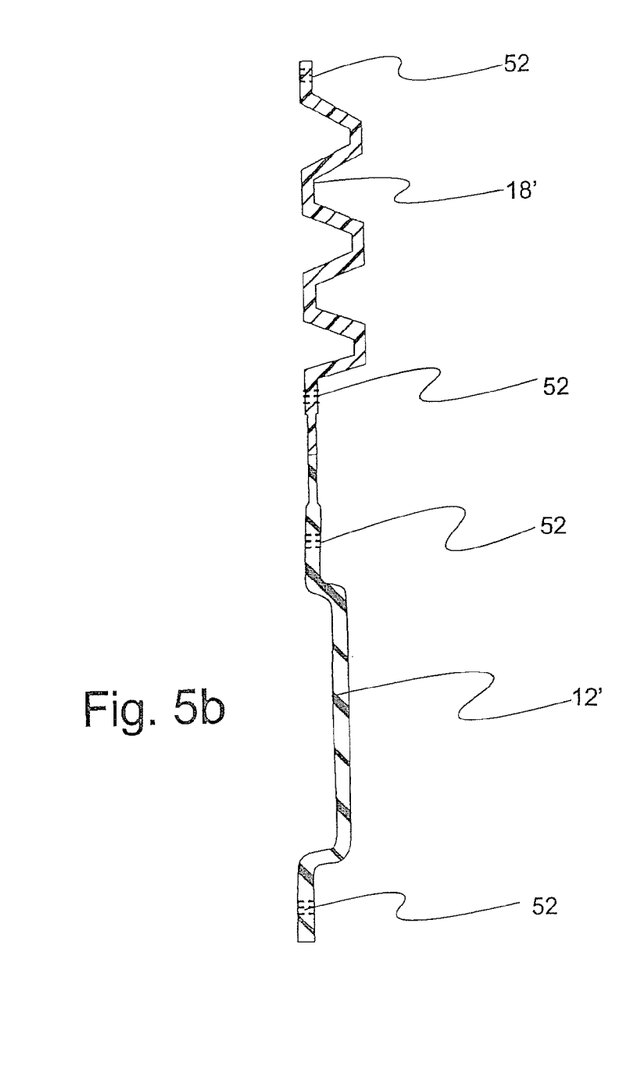
FIG. 5*b* shows a cross-section of the trim system of FIG. 5*a* in an as-molded position in accordance with an embodiment of the present invention.

FIG. 5b shows a cross-section of upper bolster 12' and side impact molding 18' taken along section line 5b-5b of FIG. 5a. Side impact molding 18' and upper bolster 12' include holes 52 capable of receiving corresponding heat stakes of substrate 28.

Figure 5C:
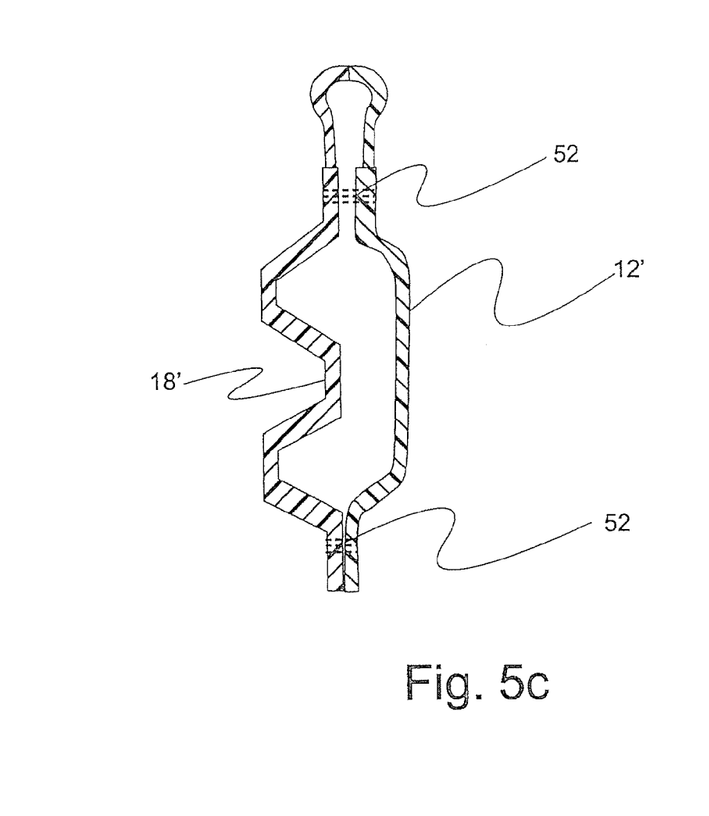
FIG. 5*c* shows a cross-section of the trim system of FIG. 5*a* in an assembled position in accordance with an embodiment of the present invention.

FIG. 5c shows side impact molding 18' in the as-kitted position, e.g., rotated 180° relative to upper bolster 12'. Side impact molding 18' can be secured in place relative to upper bolster 12' using heat stakes of substrate 28 inserted through holes 52.

Referring to FIGS. 1a, 1b, and 1c, lower bolster brim 68, map pocket close-out brim 70, speaker grille brim 72, and variable length ties 74 are shown. Variable length ties 74 allow upper bolster 12, lower bolster 16, side impact molding 18, map pocket close-out 20, and speaker grille 22 to be positioned relative to one another as shown previously.

To assemble trim system 10 with substrate 28, arm rest 14 would be rotated 90° relative to upper bolster 12 and secured in place via kitting pins 56 as explained with reference to FIGS. 4a-4d. Four-way round hole 26a would be inserted onto heat stake 42a and two-way slot 24b would be inserted onto heat stake 42b. Manufacturing variability, however, may result in the rest of two-way slots 24 and four-way round holes 26 associated with lower bolster 16, side impact molding 18, map pocket close-out 20, and speaker grille 22 to be misaligned relative to their respective heat stakes 42 of substrate 28.

Variable length ties 74 allow lower bolster 16, side impact molding 18, map pocket close-out 20, and speaker grille 22 to move relative to each other and relative to four-way round hole 26 and two-way slot 24 associated with upper bolster 12 such that the four-way round holes 26 and two-way slots 24 associated with each of lower bolster 16, side impact molding 18, map pocket close-out 20, and speaker grille 22 may be aligned with their respective heat stakes 42 of substrate 28.

With arm rest 14 rotated 90° relative to upper bolster 12 and secured in place as discussed above, lower bolster 16 can then be adjusted within opening 34 and placed onto appropriate heat stakes 42 followed by speaker grille 22, map pocket close-out 20, and side impact molding 18.

Figure 6A:
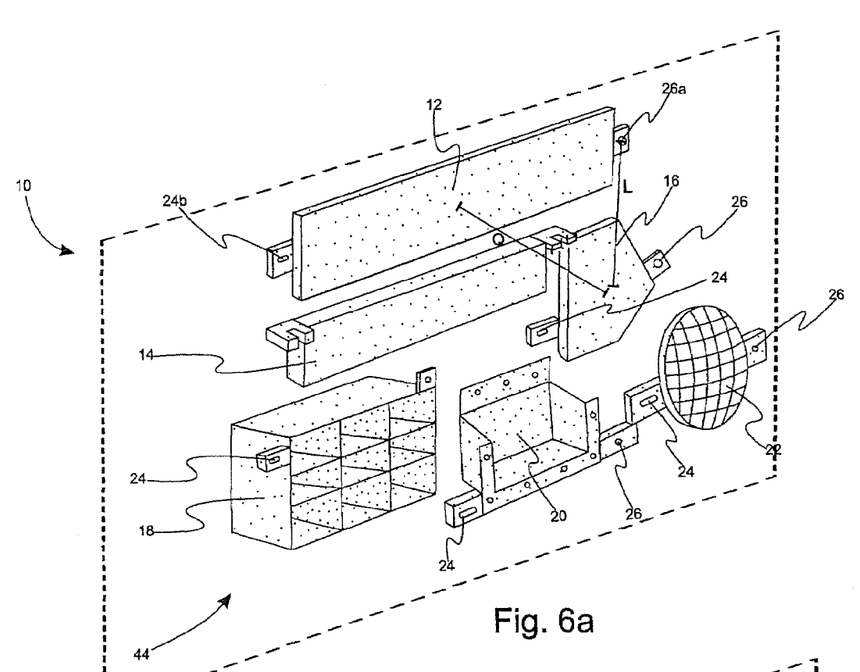
FIG. 6*a* shows a trim system in an as-molded position in accordance with an embodiment of the invention.

FIG. 6a shows portions of trim system 10 in as-molded position 44. "L" is the distance between four-way round hole 26a associated with upper bolster 12 and lower bolster 16. "Q" is the distance between upper bolster 12 and lower bolster 16.

Figure 6B:
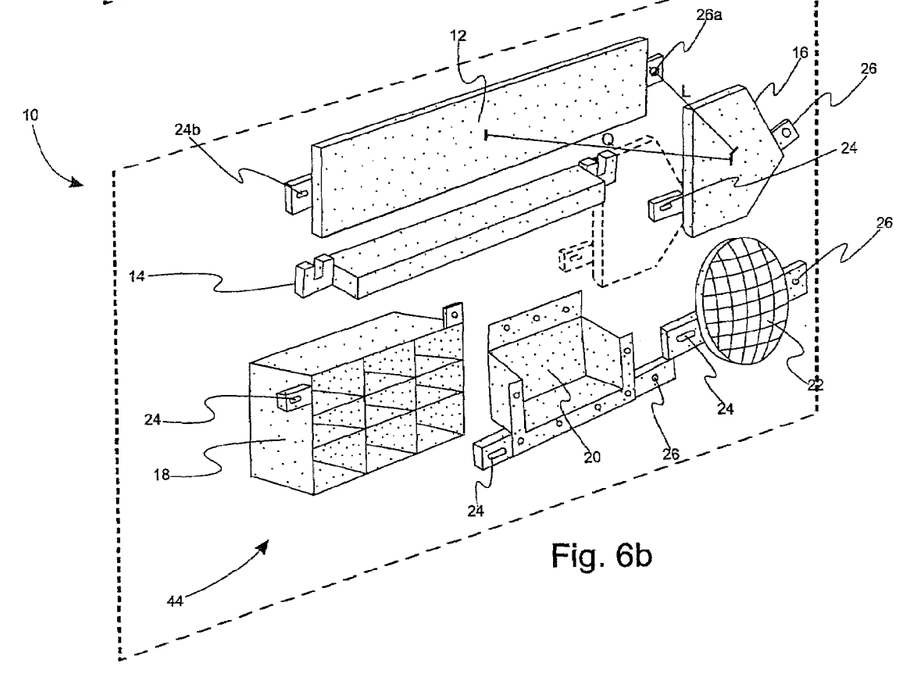
FIG. 6*b* shows the trim system of FIG. 6*a* in an assembled position in accordance with an embodiment of the invention.

FIG. 6b shows portions of trim system 10 after assembly with substrate 28. Distance "L" in the as-molded position 44 is less than distance "L" after assembly with substrate 28. Distance "Q" in the as-molded position 44 is less than distance "Q" after assembly with substrate 28.

Figure 7A:
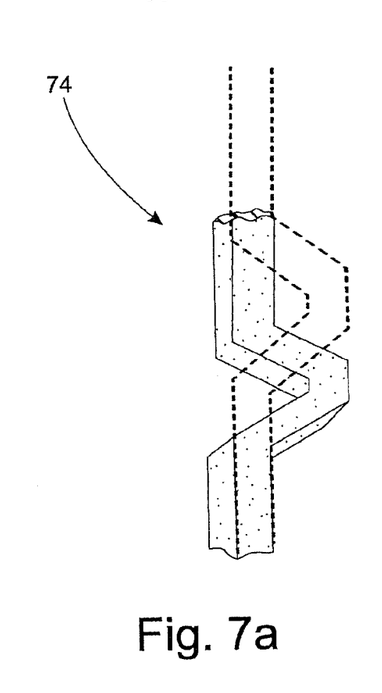
FIG. 7*a* shows a portion of a trim system in accordance with an embodiment of the present invention.
Figure 7B:
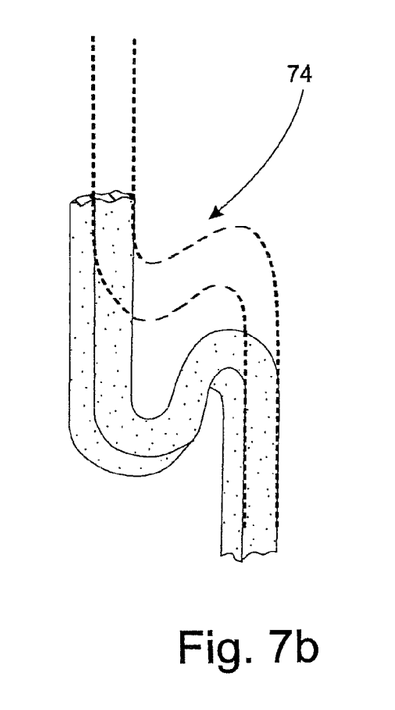
FIG. 7*b* shows a portion of a trim system in accordance with an embodiment of the present invention.

FIG. 7a shows a bellows configuration for a portion of tie 74. This bellows configuration would allow features or locators connected with it to be adjustable. FIG. 7b shows a curved configuration for a portion of tie 74. This curved configuration would allow features or locators connected with it to be adjustable. Ties 74, however, may have any suitable configuration, or be made from any suitable material, such as an elastomer, that would allow them to achieve a variable length.

System 10 may be molded using polypropylene (PP), acrylonitrile butadiene styrene (ABS), or any other suitable material.

Sequential valve gates may be used to fill each part separately.

To provide a full or partial coverstock, e.g., cloth or vinyl, Low Pressure Molding (LPIM) or In Mold Lamination (IML) techniques can be employed. These techniques allow a combination of covered and uncovered surfaces on a single part or sequence of parts. In either case the coverstock is hung in the tool and resin injected behind it.

Two shot molding technology can further enhance the surface finishes available within system 10. In this case, either a moving core or rotating cavity technology can be employed. The two shot technique provides for areas of soft surface resins to be molded over a structural surface and thus provides well supported but soft regions.

Multi barrel technology can be used to inject multiple resins having, for example, differing structural, tactile, or color qualities to enhance the perception of quality in a vehicle.

In the event that features are molded from chemically incompatible materials that will not bond, these features may be mechanically attached either during the molding process in the tool or manually by the use of snaps at the demolding or kitting table.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A trim system configured to be assembled in an assembled position with a vehicle door panel substrate having a first feature receiving portion and a second feature receiving portion, the system comprising:
    a first trim feature configured to be received by the first feature receiving portion; and
    a second trim feature configured to be received by the second feature receiving portion, the second trim feature being moveable, after the first trim feature is assembled with the substrate, relative to the first trim feature and within the second feature receiving portion to position the second trim feature within the second feature receiving portion in the assembled position.

2. The system of claim 1 wherein, after assembly with the substrate, a distance between the first trim feature and the second trim feature is greater than the distance between the first trim feature and the second trim feature before assembly with the substrate.

3. The system of claim 1 wherein the first trim feature and the second trim feature are molded substantially in the assembled position.

4. The system of claim 1 wherein at least one of the first trim feature and the second trim feature is molded substantially out of the assembled position.

5. The system of claim 1 wherein the first trim feature is at least one of an impact bracket, a bolster, a speaker grille, and a pocket.

6. The system of claim 1 wherein an appearance of the first trim feature and an appearance of the second trim feature are different.

7. The system of claim 1 further comprising a variable length runner connected with the first trim feature and the second trim feature.

8. The system of claim 7 wherein a material of one of the first trim feature and the second trim feature and a material of a portion of the runner are different.

9. The system of claim 7 wherein the runner includes at least one of a bellows portion and a curved portion permitting the runner to have a variable length.

10. A trim system configured to be assembled in an assembled position with a vehicle door panel substrate having a plurality of receiving locators and a plurality of feature receiving portions, the system comprising:
    a feature locator being configured to locate the trim system relative to the substrate via one of the plurality of receiving locators; and
    a pair of trim features being associated with the feature locator, each of the pair of trim features being configured to be received by one of the plurality of feature receiving portions, the pair of trim features being hingedly moveable relative to each other in order to position the pair of trim features in the assembled position prior to locating the trim system relative to the substrate.

11. The system of claim 10 wherein at least one of the feature locator and the pair of trim features is molded substantially out of the assembled position.

12. The system of 10 wherein each of the pair of trim features is at least one of an impact bracket, a bolster, a speaker grille, and a pocket.

13. A trim system configured to be assembled in an assembled position with a vehicle door panel substrate having a plurality of feature receiving portions and a plurality of receiving locators, the system comprising:
    a plurality of feature locators, at least one of the plurality of feature locators being configured to locate the trim system relative to the substrate via one of the plurality of receiving locators; and
    a plurality of trim features each being connected with at least one of the plurality of feature locators, one of the plurality of trim features being moveable, after the trim system is located relative to the substrate, within one of the plurality of feature receiving portions and relative to the one of the plurality of receiving locators in order to position another one of the plurality of feature locators relative to another one of the plurality of receiving locators.

14. The system of claim 13 wherein the plurality of feature locators and the plurality of trim features are molded substantially in the assembled position.

15. The system of claim 13 wherein at least one of the plurality of feature locators and at least one of the plurality of trim features are molded substantially out of the assembled position.

16. The system of claim 13 wherein each of the plurality of trim features is at least one of an impact bracket, a bolster, a speaker grille, and a pocket.

17. The system of claim 13 further comprising a variable length runner connected with the one of the plurality of trim features, the one of the plurality of trim features being moveable within the one of the plurality of feature receiving portions via the variable length runner.

18. The system of claim 17 wherein a material of the one of the plurality of trim features and a material of a portion of the runner are different.

19. The system of claim 17 wherein the runner includes at least one of a bellows portion and a curved portion permitting the runner to have a variable length.

* * * * *